UNITED STATES PATENT OFFICE.

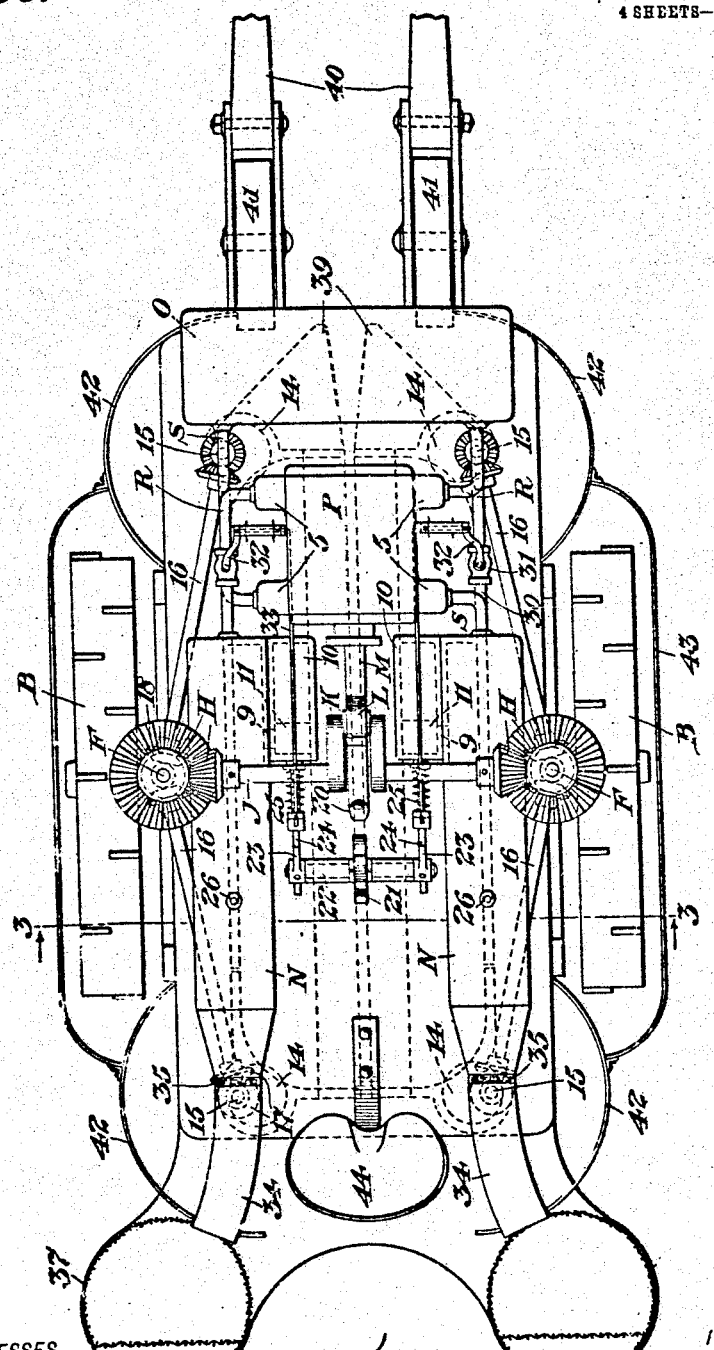

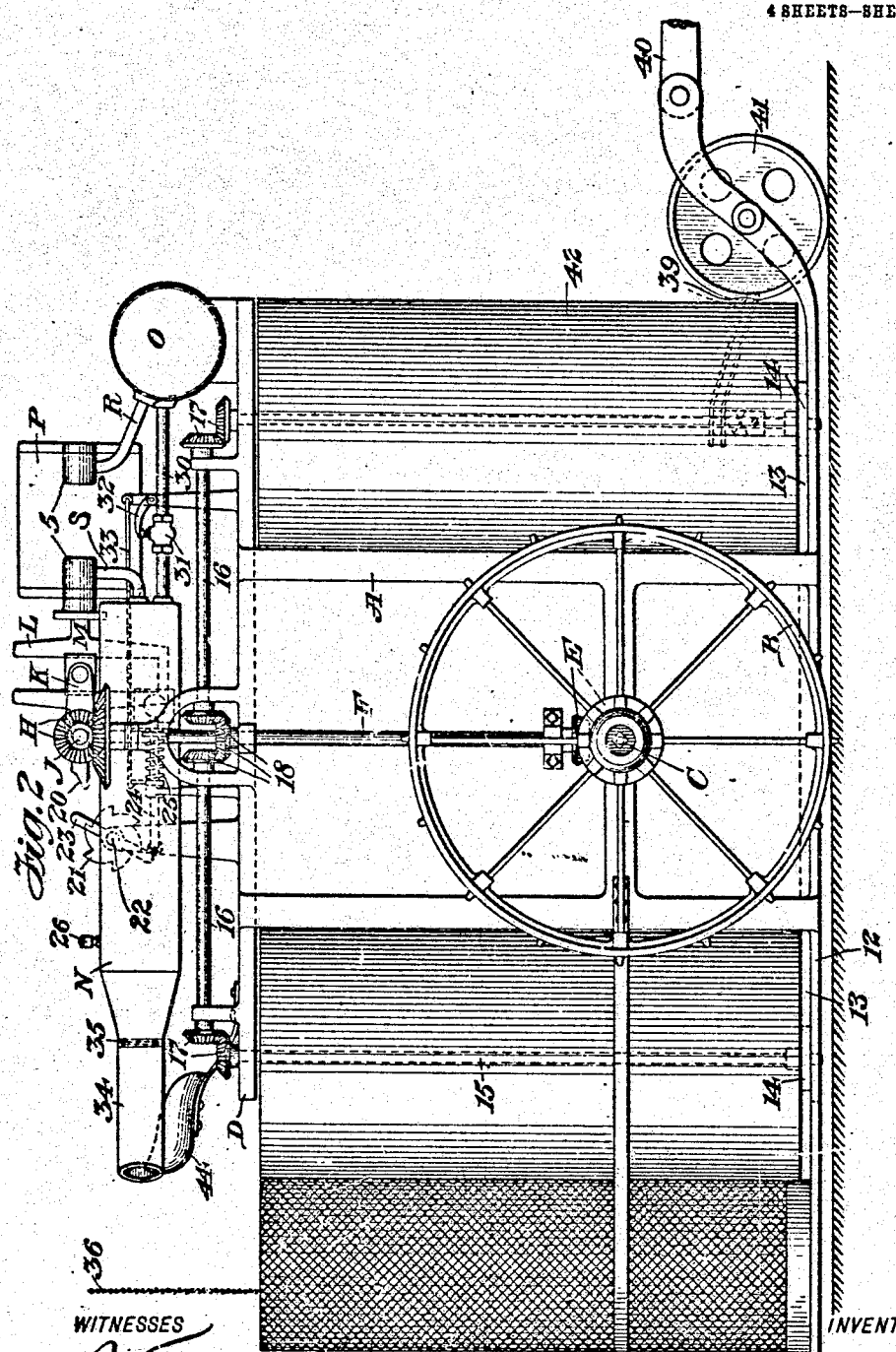

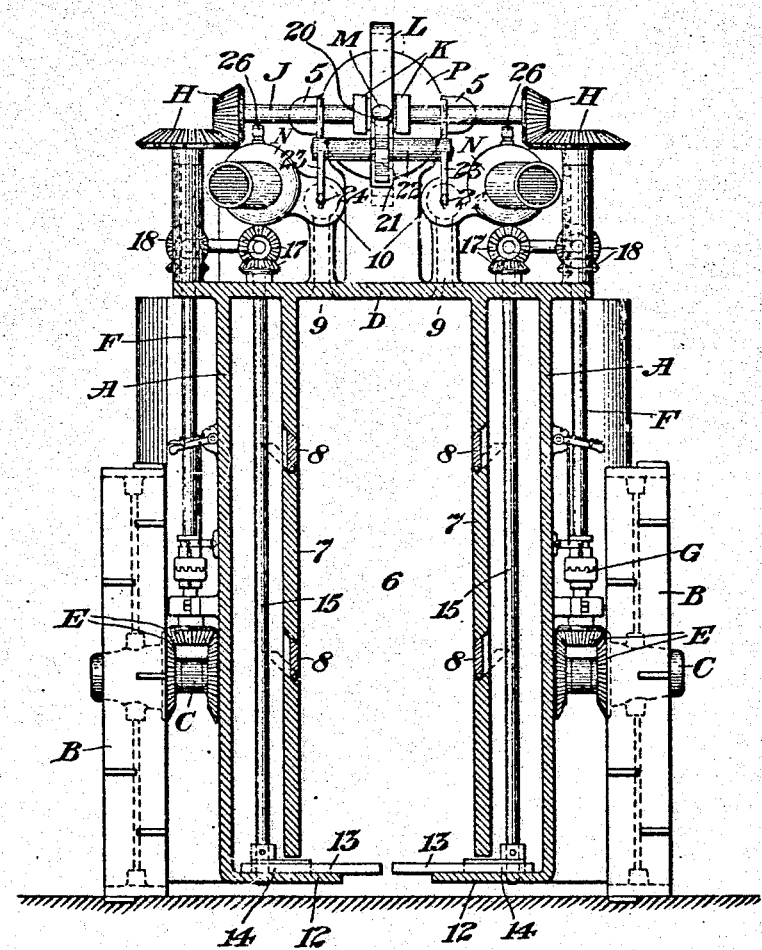

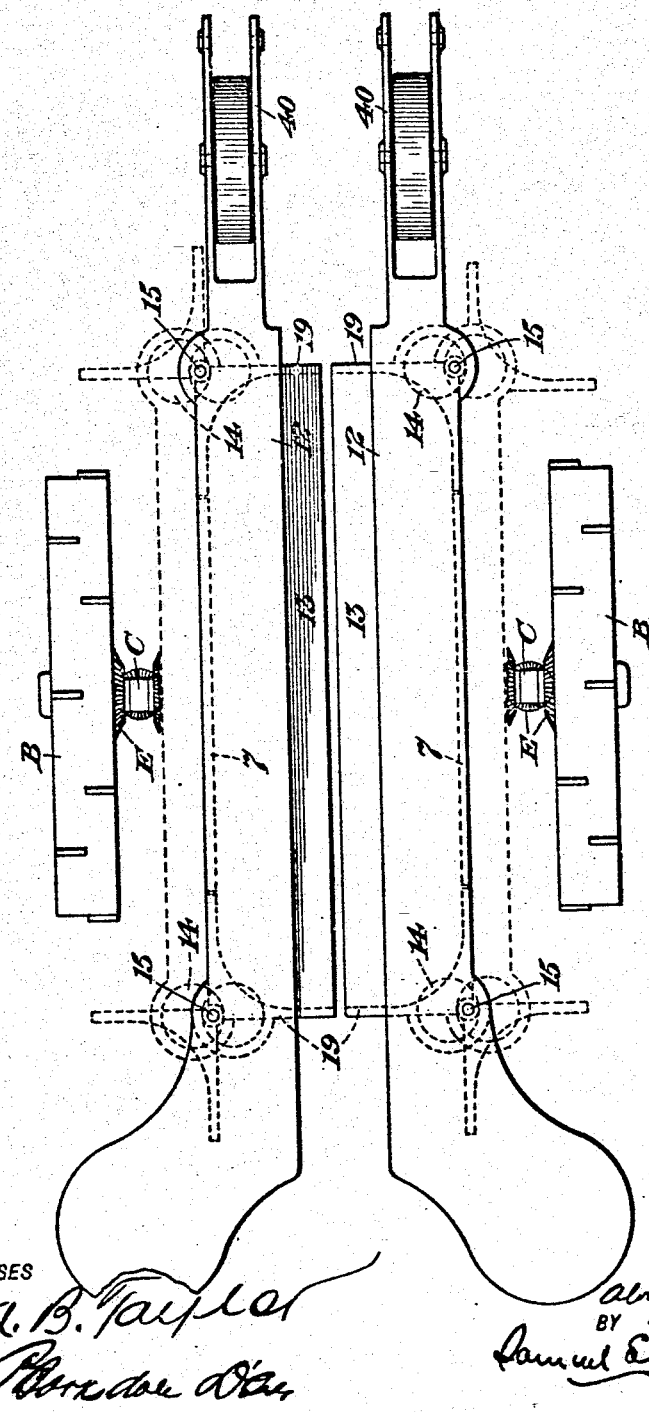

ALONZO G. KINYON, OF GREENSBORO, NORTH CAROLINA.

COTTON-PICKING MACHINE.

968,856.   Specification of Letters Patent.   Patented Aug. 30, 1910.

Application filed March 23, 1907. Serial No. 364,095.

*To all whom it may concern:*

Be it known that I, ALONZO G. KINYON, a citizen of the United States, and residing at Greensboro, in the county of Guilford, State of North Carolina, have made a certain new and useful Invention in Cotton-Picking Machines, of which the following is a specification.

This invention relates to cotton picking machines.

The object of the invention is to provide a machine which is simple in construction, and efficient in operation, for picking cotton.

A further object of the invention is to provide a pneumatic cotton picking machine.

A further object of the invention is to provide a machine for picking cotton wherein the cotton stalks or plants are practically inclosed within a chamber, and a pneumatic suction created in such chamber to pick or draw the cotton from the opened bolls without injury to the unopened bolls.

A further object is to provide a machine of the character referred to wherein a vacuum is created and stored up in advance of the time when the pneumatic suction is required in the plant or picking chamber.

A further object is to provide means for efficiently delivering the picked cotton.

Other objects of the invention will appear more fully hereinafter.

The invention consists substantially in the construction, combination, location and relative arrangements of parts, all as will be more fully hereinafter set forth, as shown in the accompanying drawings, and finally pointed out in the appended claims.

Referring to the accompanying drawings, and to the various views and reference signs appearing thereon,—Figure 1 is a view in top plan of a machine embodying the principles of my invention. Fig. 2 is a view in side elevation of the same. Fig. 3 is a view in transverse section on the line 3, 3, Fig. 1, looking in the direction of the arrows. Fig. 4 is a bottom plan view, looking upward, and showing one position of the ends or angle plates, of the plant or picking chambers, in full lines, and another position in dotted lines.

The same part is designated by the same reference signs wherever it occurs throughout the several views.

One difficulty encountered in attempting to pick or gather cotton by machinery resides in the fact that the cotton bolls on a stalk or plant do not all open at the same time, and, consequently, in operating a mechanical picking machine, it is necessary to provide against the danger of injuring the stalk or plant, as well as the unopened bolls, during the operation of picking or gathering the opened cotton, moreover, cotton stalks or plants grow with great irregularity as to size or height, and, hence, a machine which is adapted for use in gathering or picking cotton from stalks or plants of a certain height is not adapted for use in picking cotton from stalks of varying height. Machines have been proposed wherein picking arms are caused to be brushed or wiped over the stalks and depend upon being brought into contact with the opened cotton as the machine progresses through the field. Such machines not only operate on the exceedingly inefficient "hit or miss" principle, but they injure the stalks or plants, break off the limbs, or cause the unopened bolls to become broken down, bruised, or destroyed. Machines have also been proposed wherein picker arms have been universally pivoted and are presented manually to the cotton of each opened boll to engage and extract or pull such cotton from the bolls. Such machines, however, required the manual labor, as well as the skill, necessary to direct the picker arms to each individual opened boll, on each stalk, thereby rendering the picking operation not only slow but tedious and expensive. And it makes no difference whether the picker arms of such machines carry picker fingers, or belts, or whether they pick or extract the cotton pneumatically, the same amount of labor and time is required to direct the picker arms to individual opened bolls in the one case as in the other.

It is among the special purposes of my present invention to provide a cotton picking machine which avoids the objections and overcomes the difficulties noted and which may be progressed through the field whatever may be the variation in the height of the stalks or plants, and which may be repeatedly operated over the same stalks or field without injuring the stalks or the unopened bolls.

In accordance with the principle of my invention I propose to employ a picking or plant chamber adapted to be progressed through the field and along a row of stalks, and which, at suitable intervals, is closed upon the plants to form practically or substantially an air tight chamber, and while the chamber is closed upon the plants, I create a suction in such chamber whereby any opened cotton on the inclosed stalks or plants is sucked or pulled out of their bolls, while injury to the plant or stalk, or the limbs thereof, or to the unopened bolls, is avoided. And in order to attain efficiency as well as speed and rapidity of operation of the machine and to still further guard against injury to the stalks or plants, I provide means whereby during the instant the suction is created in the picking or plant chamber said chamber is stationary, so far as relative movement thereof with respect to the inclosed stalks or plants is concerned, but without arresting the speed of progression of the machine along the row. I also propose to create and store up a vacuum in advance of the instant when the suction is required in the plant or picking chamber, and then, at the required instant, to open communication between the vacuum chamber and the plant or picking chamber, whereby the suction effort exerted upon the opened cotton is imposed suddenly thereon, thereby insuring an efficient gathering or extraction of the opened cotton, while at the same time I propose to so regulate and control the vacuum as to avoid injuring the stalk, limbs or unopened bolls. I also propose to deliver the cotton as thus pneumatically picked or gathered, through the medium of an air blast, or otherwise, and in such manner as to eliminate any dried leaves, particles of twigs, bolls, sand, dirt, or the like, that may have been drawn into the apparatus with the suction effort.

These and other desirable objects and purposes incident to the carrying of my invention into practical operation may be accomplished in a wide variety of specifically different mechanical constructions and arrangements of apparatus. While, therefore, I have shown, and will now describe one construction of apparatus, and the best form in which I at present contemplate carrying my invention into operation, I desire it to be strictly understood that my invention is not to be limited or restricted, in the broad and generic scope thereof, to the particular construction and arrangement shown and described.

In the particular construction shown, I mount a framework A, upon wheels B, suitably journaled on stub axles C, carried in the side bars of the main frame and which are of angle or arch form so as to overreach or straddle a row of cotton stalks, the wheels B, operating on opposite sides of each row, and the top beam or bar D, of the frame being carried at a sufficient height to pass over the tops of the cotton stalks. The wheels B, revolve, as the machine is propelled or drawn along, and, through gearing E, preferably differential gearing, to compensate for the turning of the machine, drive shafts F, are driven from the wheels B. Preferably, clutches G, are provided which enable the shafts F, to be thrown out of operation when desired, as when the machine is being driven or propelled to and from the field where it is to be used.

Through gearing H, a crank shaft J, is driven from the vertical shafts F, said shaft J, extending transversely of the machine and carrying a crank K, arranged to actuate a piston rod M, in any suitable or convenient manner, as, for instance, through a slotted cross head or Scotch yoke L. Cylinders N, N, which I call vacuum chambers, are arranged and supported on opposite sides of the machine, and a pressure chamber O, is also supported upon the framework.

P, is a pump cylinder; a pipe R, leads from one side of one end of the pump cylinder to the pressure tank, and a pipe S leads from the same side of said cylinder but from the opposite end thereof to one of the vacuum chambers, while from the corresponding ends of the cylinder on the opposite side thereof pipes R and S, lead respectively to the other vacuum chamber and to the pressure tank. Suitable check valves carried in the casings 5, of these pipe connections operate to control the air during the operation of the piston within the cylinder P, and to which the piston rod M, is connected, in such manner that, as the piston moves back and forth in said cylinder, the air is exhausted from the vacuum chambers N, and is compressed into the pressure chamber O.

Reference sign 6, designates a chamber which I will call the plant or picking chamber. This chamber may be formed in any suitable or convenient manner. I have shown such chamber as being open at its ends and bottom, and having the side walls 7. These side walls are provided with openings at convenient points, said openings being controlled by damper valves 8, in a manner and for a purpose presently to be more fully explained.

A passage indicated at 9, see Figs. 1, and 3, opens communication between the picking or plant chamber 6, and the vacuum chambers N, through a valve casing 10, in which operate slide valves 11, for controlling said passages 9, whereby, by shifting said slide valves, communications may be established between the picking or plant chamber 6, and the vacuum chambers N, N, at the right moment in the operation of the apparatus. The stationary bottom walls or plates 12, of the chamber 6, project inwardly toward each other from opposite sides of the machine, as shown, the inner edges thereof being separated from each other through a convenient distance. Supported upon these stationary bottom plates are movable plates 13, to which a longitudinal as well as a to and fro movement toward and from each other is imparted in any suitable or convenient manner. I have shown a simple arrangement for accomplishing this result, to which, however, my invention is not to be limited or restricted, wherein said movable plates are operated by means of eccentrics 14, driven from any suitable or convenient source, as, for instance, from shafts 15, and 16, and intermeshing gears 17, 18, and drive shafts F, as clearly shown. These movable plates 13, extend longitudinally of the machine and a very short distance above the surface of the ground, and as the machine progresses along a row of cotton stalks said stalks are received and pass through the space between the proximate edges of the said plates, and when said plates are caused to approach each other to their greatest extent, only sufficient space is left between their adjacent edges to accommodate the thickness of the stems of the cotton stalks therebetween. If desired, and in order to avoid danger of injuring the stalks, the inner edges of these plates may be faced with some resilient material, such as felt, rubber, or the like. During the time these plates occupy their relative positions of closest proximity to each other said plates are also moved longitudinally and in a direction opposite to that in which the machine is being progressed along the row of cotton stalks, and preferably the gearing which imparts the longitudinal movements to the plates 13, is so relatively proportioned that the speed of rearward longitudinal movement of said plates coincides with the speed of progression of the machine so that, during the time the plates are in their closest proximity there is practically no relative movement of the proximate edges of the plates and the cotton stalks. This is a most desirable feature for the reason that thereby danger of injury to the cotton stalks is avoided.

The speed of progression of the machine along a row should be so calculated with reference to the length of the chamber 6, in the direction of such movement, and also with reference to the to and fro movement of plates 13, toward and from each other, that the machine will be carried along the row a distance somewhat less than the length of the chamber 6, during the interval between two successive approaches of the inner edges of the plates 13, to their fullest extent toward each other. By reason of this arrangement I am enabled to successively inclose definite lengths of the row of cotton stalks within the chamber 6, and also to thereby enable every part of the stalk at the extreme forward end of the chamber, and which might be only partially inclosed at one closure of the chamber, to be inclosed at the next successive closure of the chamber.

As above stated the chamber 6, is open at its ends. These open ends, however, are periodically closed, and in proper time so that when the bottom plates 13, are brought into their closest proximity, a practically closed chamber is produced, as well at the bottom as at the ends thereof, and which closed chamber embraces or incloses the cotton stalks within the range of the length of such chamber. This closing of the ends of the chamber may be effected in many specifically different ways. I have shown a simple means for accomplishing the desired result, but my invention is not to be limited or restricted to the specific arrangement shown. In carrying out this part of my invention it is desirable to provide for the ready passage of the cotton stalks into and out of the chamber as the machine progresses along the row. Therefore, I provide at the front and rear ends of the chamber, and on opposite sides thereof the revoluble angle plates 19, see Fig. 4, mounted upon and rotated by the shafts 15, and which coöperate with each other and with the side walls 7, of the chamber 6, and are so timed in the operation thereof, as to close the ends of the chamber at the proper moment.

I have above indicated that passages are provided for opening communication between the chamber 6, and the vacuum chambers N, and that such passages are controlled by the valves 11. It is important that said valves be so controlled and timed in the operation thereof as to cause said communication to be opened between the plant or picker chamber and the vacuum chambers at the instant the chamber 6, has become closed. Many specifically different constructions may be devised for operating these valves. In the form shown, to which, however, I do not desire to be limited or restricted, I provide the piston M, with a rearward extension 20, adapted to engage a tooth on a ratchet wheel 21, at each rearward movement of the piston, thereby imparting a step by step rotation to the ratchet wheel 21. This ratchet wheel is carried on a shaft 22, suitably supported and journaled, and which carries arms 23, at the ends thereof. At each half revolution of the ratchet wheel one or the other ends of the arms 23, are brought into engagement with the end of the rod or stems 24, of the slide valves 11, thereby shifting or moving said valves to open the communication between the picker or plant chamber 6, and the vacuum chambers N, N. The opening movements of these valves are yieldingly opposed in any suitable manner, as, for instance, by means of springs 25, the tension of which is constantly exerted upon the valves tending to close them, and, hence, operating to close said valves the instant the ends of the arms 23, ride off or past the ends of the valve stems. In practice I prefer to so relatively arrange the gearing, and to so time the operation of these devices that the piston rod M, will make three complete strokes forward and backward, between successive opening movements of the slide valves 11. To this end the ratchet wheel 21, is provided with six ratchet teeth, and hence one or the other of the ends of each of the arms 23, will engage and actuate its associated valve stem 24, at each half revolution of the ratchet wheel 21. My invention however, is not to be limited to the specific details of structure for accomplishing this result as many other constructions and arrangements might well answer the same purpose.

Of course it will be understood that the opening of the slide valves 11, to establish communication between the picker or plant chamber 6, and the vacuum chambers N, N, is so timed as to take place at the instant the chamber 6, is completely closed, as above described; that is, at the instant the slide plates 13 occupy their positions of closest proximity, and the angle plates 19, at each end of the chamber 6, are closed, as shown in Fig. 4, in full lines. By establishing this communication between the chambers 6, and N, N, at this instant, a suction effort is suddenly induced through the chamber 6, and the passages 9, which extracts or pulls out the opened cotton from their bolls on the stalks or plants inclosed within the said chamber 6, and sucks or draws the same through the passages 9 into the vacuum chambers N, N.

The degree of vacuum created in the chambers N, N, should be so regulated and controlled as not to cause such an excessive suction effort as to break off unopened bolls, within the chamber. This regulation and control may be effected in many specifically different ways. I have shown a simple way, to which, however, my invention is not to be limited or restricted, wherein the vacuum chambers N, N, are provided with relief valves 26.

By the operation of the suction effort thus created in the picking or plant chamber it will be seen that the opened cotton is sucked out of their bolls and into the vacuum chambers. The time required for this operation is very short so that the operation takes place at the instant the chamber 6, is completely closed, and while the machine is being continuously advanced along the row, so that the action of the suction apparatus and of the opening and closing of the chamber 6, are coincidently recurrent at regular intervals, and with respect to successive sections of the row of stalks, the machine being advanced after each such closing and suction operation, a distance somewhat less than the length of the chamber 6, before said chamber is again completely closed. After the cotton is thus drawn into the vacuum chambers it is necessary to deliver it therefrom. Many specifically different constructions and arrangements may readily be devised for accomplishing this purpose. I have shown a simple arrangement for accomplishing the desired object pneumatically but I do not desire to be limited or restricted to the particular construction shown and described. In the arrangement shown pipes 30, extend from the pressure chamber O, to the vacuum chambers N, N. In these pipe connections are arranged control valves 31, preferably in the form of puppet valves adapted to be normally closed. Any suitable arrangement of devices may be employed for automatically opening these valves at the proper point in the operation of the machine so as to deliver an air blast from the pressure chamber O, into the vacuum chambers, N, N. I have shown a simple arrangement wherein the puppet valves are acted upon by fingers 32, carried by a rock shaft which is actuated by a rod connection 33, extending into position to be engaged and actuated by the movement of the stem 24, of the valves 11. It is desirable that the puppet valves 31, be opened only after the valves 11, are closed and practically immediately thereafter, therefore the rod 33, is so relatively arranged as to be engaged and operated after the end of arm 23, has passed beyond the valve stem 24, to permit said stem to return to its initial and normal position under the influence of spring 25.

The delivery of the air blast into the vacuum chambers N. N, serves to drive the accumulated cotton longitudinally through such chambers and out of the rear ends 34, thereof, which are preferably reduced in diameter. A trap valve indicated at 35, is arranged in the delivery ends of the vacuum chambers and normally are maintained in closed position. When, however, the air blast is delivered into said chambers, these trap valves or doors open outwardly, permitting the accumulated cotton to be driven therethrough. Arranged in front of the delivery ends of the vacuum chambers and against which the blast of cotton and air are delivered is a screen 36, which will permit any sand, dried leaves, twigs, sticks or the like to pass through, and hence to be eliminated from the cotton, while the cotton is permitted to fall down into baskets 37, arranged thereunder to receive the same. As rapidly as the baskets become filled in the operations of the machine, they are removed and replaced by empty ones.

It sometimes happens that the greatest quantity of opened cotton occurs at the top of the stalk or plant, while at other times the greatest amount of opened cotton occurs at a point lower down on the stalk. It is, of course, desirable to concentrate the suction effort of the vacuum chambers upon that portion of the stalks or plants which carry the greatest average amount of opened cotton. For this reason the damper valves 8, are formed in the walls 7, of the picker or plant chamber, and which valves may be set into more or less open position, by hand or otherwise, and either at the bottom of the chamber or at a farther point upwardly therein, to enable the suction effort to be concentrated as may be desired, and upon the desired average height of the opened cotton.

Sometimes it occurs that the lower limbs of the cotton stalk are bent down to rest upon the ground, or the stalks themselves may be bent or blown over on the ground or otherwise displaced from a true linear arrangement in the row. In order to pick up the bent over limbs or branches of the stalk or plant or the stalks or plants themselves and to bring the stalks into proper line to enter the picker chamber, or rather into proper line for the chamber to be advanced thereover and to inclose the same, I provide at the front end of the chamber the deflector plates 39, which extend forwardly and present an enlarging opening therebetween. These plates are designed to operate in such close proximity to the ground as to pick up any bent stalk or limb and to guide and direct the same into the picking or plant chamber. If desired, and in order to shake off any accumulated sand or dirt on the overblown or broken down stalk or limb thus picked up and directed into the chamber, said deflector plates may be hinged as indicated in the drawings and given a vibratory movement in any suitable or convenient manner, as, for instance, from cams on the vertical shafts 15, at the front end of the machine.

A machine embodying the principles of my invention, as above described, may be propelled over the ground or drawn thereover in any suitable or convenient manner. Merely as illustrative of the idea, I have shown draft poles 40, but, of course, my invention is not limited or restricted to this manner of propulsion nor to this construction. If desired, and in order to support the overbalance of the machine forward, or at any other point if required, I provide the rollers 41. In order to prevent the revoluble end brackets 19, from engaging in cotton stalks in adjacent rows and thereby breaking or injuring them, I may inclose said brackets in shields 42. If desired, and for similar reasons, the wheels B, may also be covered over with shields 43. A seat 44, may be provided for the driver or attendant of the machine at a convenient point from which the operation of the machine may be controlled.

From the foregoing description it will be observed that I provide a machine for picking or gathering cotton wherein a chamber is continuously advanced along a row of cotton stalks and is successively closed upon a section of the row of stalks and into such relation therewith as to practically inclose the same in a substantially airtight compartment, and then a previously accumulated vacuum is made effective to exert a suction effort upon the opened cotton bolls of the stalks contained within the closed chamber, thereby extracting or drawing the opened cotton from their bolls. Of course, a very short space of time is required for this suction effort to be exerted in order to enable it to accomplish its function. The cotton thus drawn from the bolls accumulates under the influence of the suction effort exerted thereon by the vacuum within the vacuum chambers and is delivered therefrom pneumatically and in such manner as to eliminate any sand, sticks, twigs, particles of bolls, dried leaves or the like. It will also be seen that in the operation of the machine injury to the stalks or plants or to unopened bolls is avoided and the machine may be operated repeatedly over the same row of stalks or plants. It will also be seen that the machine may be operated in proper relative speed of operation with respect of progression of the machine along the row.

It is believed that the operation of the machine will be fully understood from the foregoing description.

Having now set forth the object and nature of my invention and a construction embodying the principles thereof, and having described such construction, its purpose, function and mode of operation, I desire it to be understood that many variations and changes in the details of construction might readily occur to persons skilled in the art and still fall within the spirit and scope of my invention. But

What I claim as new and useful and of my own invention, and desire to secure by Letters Patent of the United States is:—

1. In a machine for picking cotton, a chamber adapted to be moved along a cotton row, means for periodically closing said chamber upon the cotton stalks as the machine progresses, and means for creating an air current through said chamber, whereby the opened cotton is extracted from the bolls on the stalk.

2. In a machine for picking cotton, a chamber adapted to be moved along a cotton row, means for periodically closing said chamber upon the cotton stalks, a vacuum chamber, and means for opening communication between said chambers.

3. In a machine for picking cotton, the combination with means for periodically inclosing the cotton stalks as the machine progresses, of means for subjecting the inclosed cotton stalk to the action of an air draft.

4. In a machine for picking cotton, a picking chamber, means for periodically opening and closing the same as the machine progresses, and means for creating an air draft through said chamber when it is closed.

5. In a machine for picking cotton, a picking chamber, means for successively opening and closing the same, means for progressing said chamber along a cotton row, and in inclosing relation with respect to the cotton stalks, a vacuum chamber, and means for automatically opening communication between said chambers at the instant said picking chamber is closed.

6. In a machine for picking cotton, a picking chamber, means for progressing the same along and in encompassing relation with respect to a row of cotton stalks, means for successively opening and closing said chamber upon said stalks as the same is progressed along the row, and means for creating an air draft through said chamber at the instant said chamber is closed.

7. In a machine for picking cotton, a picking chamber, means for progressing the same along and in encompassing relation with respect to a row of cotton stalks, said chamber having a member movable rearwardly as said chamber advances forwardly, and means for creating an air draft through said chamber.

8. In a machine for picking cotton, a picking chamber, means for progressing the same along and in encompassing relation with respect to a row of cotton stalks, said chamber having movable bottom plates, and means for moving said plates toward and from each other, to open and close said chamber, whereby the cotton stalks are successively inclosed within said chamber, and means for creating an air draft through said chamber at the moment it becomes closed.

9. In a machine for picking cotton, a picking chamber, means for progressing the same along and in encompassing relation with respect to a row of cotton stalks, said chamber having movable bottom plates, means for moving said plates lengthwise of said chamber, said movement being at intervals in a rearward direction with reference to the direction of progression of the chamber and at the same speed therewith, and means for creating an air draft through said chamber.

10. In a machine for picking cotton, a picking chamber, means for progressing the same along and in encompassing relation with respect to a row of cotton stalks, said chamber having movable bottom plates, means for moving said plates back and forth lengthwise of said chamber and to and from each other, to open and close said chamber, and means for creating an air draft through said chamber at the moment it becomes closed.

11. In a machine for picking cotton, a picking chamber, means for progressing the same along and in encompassing relation with respect to a row of cotton stalks, means for opening and closing said chamber, to inclose said stalks, a vacuum chamber, means for opening communication between said chambers at the moment said picking chamber is closed, and means for delivering an airblast through said vacuum chamber.

12. In a machine for picking cotton, a picking chamber, a vacuum chamber, and a pressure chamber, means for opening and closing said picking chamber, to inclose cotton stalks therein, means for opening communication between the vacuum chamber and the picking chamber, when said picking chamber is closed, and means for opening communication between said vacuum chamber and pressure chamber, when said first mentioned communication is closed.

13. In a machine for picking cotton, a picking chamber, a vacuum chamber, and a pressure chamber, means for exhausting air from said vacuum chamber, and compressing the same into said pressure chamber, means for opening and closing the picker chamber, means for opening communication between the vacuum chamber and the picking chamber, when the latter is closed, and means for opening communication between the pressure chamber and the vacuum chamber, when the first named communication is closed.

14. In a machine for picking cotton, a picking chamber, means for causing a vacuum, means for opening and closing said chamber, and means for opening communication between said chamber when closed and the vacuum.

15. In a machine for picking cotton, a picking chamber, means for periodically opening and closing the same, to successively inclose cotton stalks therein as the machine progresses, means for creating an air suction therein, and means for delivering pneumatically the picked cotton.

16. In a machine for picking cotton, a picking chamber, having open ends, means for progressing said chamber along a row of cotton stalks, said stalks passing through said open ends as the machine advances, means for periodically closing said ends, and means for creating an air draft through said chamber, when closed.

17. In a machine for picking cotton, a picking chamber having open ends, means for progressing said chamber along a row of cotton stalks and in inclosing relation with respect to the stalks, angle plates for closing said open ends, means for periodically operating said plates to close said ends and means for creating an air draft through said chamber, when closed.

18. In a machine for picking cotton, a picking chamber having an open bottom, means for progressing said chamber along a row of cotton stalks, and in encompassing relation with respect to the stalks, means for periodically closing the bottom of said chamber, and means for creating an air draft through said chamber, when closed.

19. In a machine for picking cotton, a picking chamber having an open bottom, means for progressing said chamber along a row of cotton stalks, and in encompassing relation with respect to the cotton stalks, movable plates for closing the bottom of said chamber, means for periodically moving said plates to close said chamber, and means for creating an air draft through said chamber, when closed.

20. In a cotton picking machine, a picking chamber having open ends and an open bottom, means for periodically closing said ends and bottom to inclose the cotton stalks as said chamber is progressed along a row of stalks, and means for creating a suction in said chamber when it is closed.

21. In a cotton picking machine, a picking chamber having an open bottom, plates for closing said open bottom, means for periodically moving said plates toward and from each other and when closed upon each other in a direction opposite to the direction of progression of the chamber along a row of cotton stalks at the same speed at which the machine advances, and means for creating a suction in said chamber.

22. In a cotton picking machine, a picking chamber having an open bottom, plates for closing said bottom, means for progressing said chamber along a row of cotton stalks, and in inclosing relation with respect to the stalks, means for periodically moving said plates toward and from each other and also longitudinally, the longitudinal movement being at the same speed as the speed of progression of the machine, but in the opposite direction to that of the machine and means for creating a suction in said chamber at corresponding periodic intervals.

23. In a cotton picking machine a chamber arranged in inclosing relation with respect to a row of cotton stalks, means for continuously moving said chamber along said row, means for periodically closing said chamber to envelop successive portions of the row of stalks, and means for creating a suction in said chamber when closed.

24. In a cotton picking machine, a chamber arranged in inclosing relation with respect to a row of cotton stalks, and having openings in the side walls thereof, valves for controlling said openings, means for periodically closing said chamber to envelop successive lengths of the row of stalks, and means for creating a suction in said chamber when closed.

25. In a cotton picking machine, a chamber arranged in inclosing relation with respect to a row of cotton stalks, and having openings in the side walls thereof at varying heights valves for controlling said openings, means for periodically closing said chamber to envelop successive lengths of the row of stalks, and means for creating a suction in said chamber when closed.

26. In a cotton picking machine, a chamber and means for periodically closing said chamber in inclosing relation with respect to a row of cotton stalks, means for creating a suction in said chamber when closed, and means for advancing said chamber along the row a distance less than the length of said chamber at each successive closing operation.

27. In a cotton picking machine, a chamber having open ends, means for periodically closing said ends, means for continuously moving the chamber along and in inclosing relation with respect to the row of stalks, shields for said end closing means, and means for creating a suction in said chamber when closed.

28. In a cotton picking machine, a chamber arranged in inclosing relation with respect to a row of cotton stalks, means for continuously progressing said chamber along a row of stalks, a vacuum chamber, means for exhausting the same of air, and means for periodically opening communication between said chambers.

29. In a cotton picking machine, a picking chamber arranged to be progressed along and in inclosing relation with respect to a row of cotton stalks, means for periodically closing said chamber upon successive lengths of the row of stalks, a vacuum chamber, and means for opening communication between said chambers when the picking chamber is closed.

30. In a cotton picking machine, a picking chamber arranged to be progressed along, and in inclosing relation with respect to a row of cotton stalks, means for periodically closing said chamber, a vacuum chamber, means for exhausting the same of air, means for opening communication between said chambers at the time said picking chamber is closed, and means for periodically delivering an air blast through said vacuum chamber.

31. In a cotton picking machine, a picking chamber arranged to be progressed along, and in inclosing relation with respect to a row of cotton stalks, means for periodically closing said chamber, a vacuum chamber, having an outwardly opening valve, means for opening communications between said chambers when said picking chamber is closed, to draw the opened cotton into said vacuum chamber, and means for discharging the accumulated cotton from said vacuum chamber through said valve.

32. In a cotton picking machine, a picking chamber arranged to be progressed along and in inclosing relation with respect to a row of cotton stalks, means for periodically closing said chamber, a vacuum chamber, means for opening communication between said chambers when the picking chamber is closed, to draw the opened cotton into said vacuum chamber, means for discharging the accumulated cotton from the vacuum chamber, and means for eliminating sand, sticks or the like from the cotton while being discharged.

33. In a cotton picking machine, a picking chamber arranged to be progressed along and in inclosing relation with respect to a row of cotton stalks, means for periodically closing said chamber, a vacuum chamber, means for opening communication between said chambers when the picking chamber is closed, a screen, and means for discharging from said vacuum chamber against said screen.

34. In a cotton picking machine, a main frame, supporting wheels therefor, a picking chamber, gearing actuated by the traction wheels for periodically closing said chamber, and means for creating a suction in said chamber when closed.

35. In a cotton picking machine, a main frame, supporting wheels therefor, a picking chamber and a vacuum chamber, means driven by the traction wheels for periodically closing said chamber, and means, also driven by said wheels for opening communication between said chambers when the picking chamber is closed.

36. In a cotton picking machine, a main frame, supporting wheels therefor, a picking chamber, a vacuum chamber and a pressure chamber, carried by said main frame, means driven by said wheels for periodically closing said chamber, a pump, also driven by said wheels, and having connections with said pressure and vacuum chambers respectively, and means for opening communication between said picking and vacuum chambers, when the picking chamber is closed, and means for opening communication between said vacuum and pressure chambers.

37. In a cotton picking machine, picking, vacuum and pressure chambers, connections between the picking and vacuum chambers, connections between the vacuum and pressure chambers, valves for controlling said connections, and means for operating said valves.

38. In a cotton picking machine, picking, vacuum and pressure chambers, connections between the picking and vacuum chambers and between the pressure and vacuum chambers, means for operating said valves, the valves for controlling the connections between the picking and vacuum chambers operating in advance of the operation of the valves for controlling the vacuum and pressure chambers.

39. In a cotton picking machine, picking and vacuum chambers, a pump connected to said vacuum chambers, means for periodically closing said picking chamber, connections between said chambers, valves arranged to control said connections, and means operated by the piston rod of said pump for periodically opening said valves.

40. In a cotton picking machine, picking, vacuum and pressure chambers, a pump having connections with said vacuum and pressure chambers, respectively, connections between the picking and vacuum chambers, connections between the vacuum and pressure chambers, valves in said chamber connections and means actuated by the piston rod of the pump for operating said valves.

41. In a cotton picking machine, a picking chamber arranged to be progressed along and in inclosing relation with respect to a row of cotton stalks into said chamber, means for periodically closing said chamber upon the stalks and means for creating a suction in said chamber when closed.

42. In a cotton picking machine, a picking chamber arranged to be progressed along and in inclosing relation with respect to a row of cotton stalks, directing plates for lifting and guiding the cotton stalks into said chamber, as it is progressed along the row, means for vibrating said plates, means for periodically closing said chamber, and means for creating a suction in said chamber when closed.

43. In a cotton picking machine, a picking chamber arranged to be progressed along and in inclosing relation with respect to a row of cotton stalks, means for periodically closing said chamber, means for creating a suction in said chamber, and means for concentrating the suction effort at various heights with reference to the cotton stalks.

In testimony whereof I have hereunto set my hand in the presence of the subscribing witnesses, on this 13 day of March A. D., 1907.

ALONZO G. KINYON.

Witnesses:
A. B. TAYLOR,
P. BARKSDALE D'ORR,
C. B. BOGART.